United States Patent [19] [11] 3,988,968
Peters et al. [45] Nov. 2, 1976

[54] STOP TUBE FOR CYLINDER ASSEMBLIES

[75] Inventors: Walter C. Peters, Elk Grove Village; Raymond L. Ghislain, Elmhurst; Francis S. Flick, Oakbrook, all of Ill.

[73] Assignee: Miller Fluid Power Corporation, Bensenville, Ill.

[22] Filed: Dec. 23, 1974

[21] Appl. No.: 535,277

[52] U.S. Cl. .................................... 92/85 A; 92/168
[51] Int. Cl.² ...................... F01B 11/02; F16J 15/18
[58] Field of Search ................... 92/13.6, 130 R, 65, 92/85 A

[56] References Cited

UNITED STATES PATENTS

| | | | |
|---|---|---|---|
| 2,366,382 | 1/1945 | Burton et al. | 92/85 A |
| 2,415,783 | 2/1947 | Bassett et al. | 92/65 |
| 3,347,044 | 10/1967 | Medley | 92/130 |
| 3,488,096 | 1/1970 | Hoopes | 92/130 |

FOREIGN PATENTS OR APPLICATIONS

| | | | |
|---|---|---|---|
| 1,213,291 | 3/1966 | Germany | 92/85 A |

*Primary Examiner*—Paul E. Maslousky
*Attorney, Agent, or Firm*—Wegner, Stellman, McCord, Wiles & Wood

[57] ABSTRACT

A stop tube for use in cylinder assemblies. The stop tube is defined by a base having a tube secured thereto and the base is adapted to be slidably received on the rod of a cylinder to float thereon.

6 Claims, 3 Drawing Figures

STOP TUBE FOR CYLINDER ASSEMBLIES

BACKGROUND OF THE INVENTION

This invention relates to cylinders and, more specifically, to cylinders including stop tubes.

The use of stop tubes is a generally accepted and preferred method for reducing piston and bearing loads on long push stroke cylinders. It is also employed in the prevention of jackknifing or buckling of horizontally mounted long push stroke cylinders.

When employed for the purpose of reducing bearing loads on the rod, the use of stop tubes is more effective, less costly and results in a weight savings when compared to the use of oversized piston rods.

Typically, stop tubes are secured to either the piston or a cylinder head so as to restrict the extended position of the rod and increase the distance between the piston and a bushing typically employed in the head thereby providing additional strength and side support for the extended rod.

At the same time, stop tubes, because of the separation between the piston and the head when the piston is fully extended, reduce side loading in bushings caused by non-concentricity of the bushing in the head with respect to the rod on the piston within the cylinder, thereby extending bushing life.

Heretofore, such stop tubes have normally been welded on either the head or the piston. Expensive jigs have been required to provide such welding functions. In addition, such stop tubes necessarily must be discarded when the parts of the cylinder to which they are secured are discarded and replaced in the usual course of maintenance.

SUMMARY OF THE INVENTION

It is the principal object of the invention to provide a new and improved stop tube assembly. More specifically, it is an object of the invention to provide such a stop tube assembly wherein the need for time consuming welding of the stop tube to a piston or to a cylinder head is eliminated and wherein the stop tube assembly may be reused even when the cylinder is discarded or when parts thereof are replaced in the course of routine maintenance.

Another principal object of the invention is to provide a stop tube assembly that eliminates concern for piston and seal retainer design in relation to the stop tube assembly and any springs which may be employed therewith.

Still a further object is the provision of a stop tube which can be produced and stocked on a mass basis independently of individual cylinders so as to provide for ease of manufacture and ready ability to meet the demands of customers.

The exemplary embodiment of the invention achieves the foregoing objects in a construction including a stop tube assembly freely slidably received on the rod of a cylinder in a position interposed between the piston and the head through which the rod emerges from the cylinder.

In one embodiment of the invention, a coil spring is impaled by the rod within the cylinder and the stop tube is provided with a radially outwardly extending flange which engages one end of the coil spring thereby eliminating any need for consideration of the design configuration of a seal retainer or piston with respect to receiving the end of such a spring.

In a highly preferred embodiment, the stop tube comprises a generally cylindrical base having a bore receiving the rod, which bore is of slightly greater diameter than the rod. The base also includes an annular recess in the side thereof which opens to one end of the base to define a stepped configuration. An elongated tube having an internal diameter substantially greater than the diameter of the rod is secured to the base in the recess. In this embodiment, the outer diameter of the tube is chosen to be less than the maximum outer diameter of the base to define the previously mentioned annular radially outwardly extending flange.

In the best mode of the invention, the aforementioned recess is defined by the provision of an annular, centrally located boss on one end of the base. This boss in turn is mounted on a further boss. The first mentioned boss serves as a guide for receipt of the tube on the base so as to allow ready assembly of the tube as by welding without the need of special jigs or the like.

Other objects and advantages will become apparent from the following specification taken in conjunction with the accompanying drawings.

DESCRIPTION OF THE PREFERRED EMBODIMENT

Figure 1:
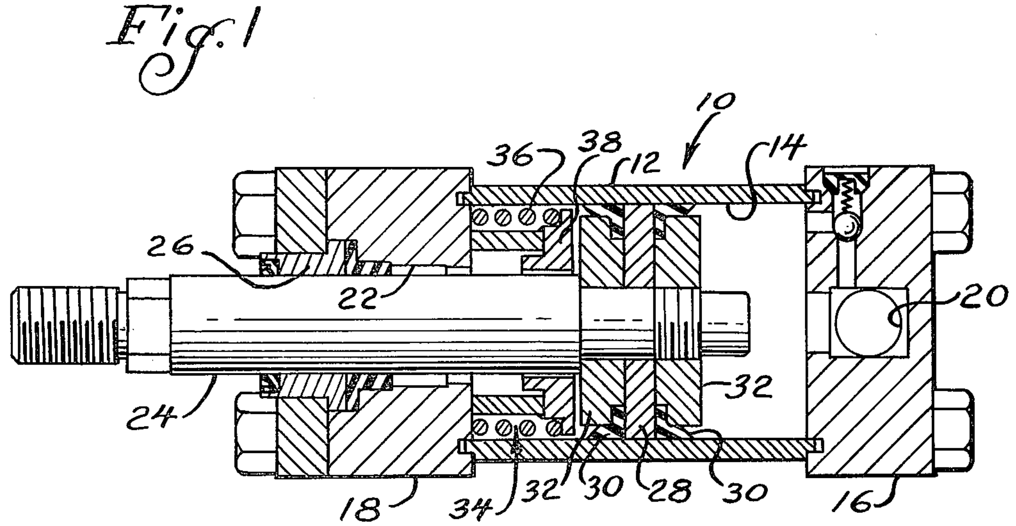
FIG. 1 is a horizontal section of a single-acting cylinder embodying a stop tube assembly made according to the invention.
Figure 2:
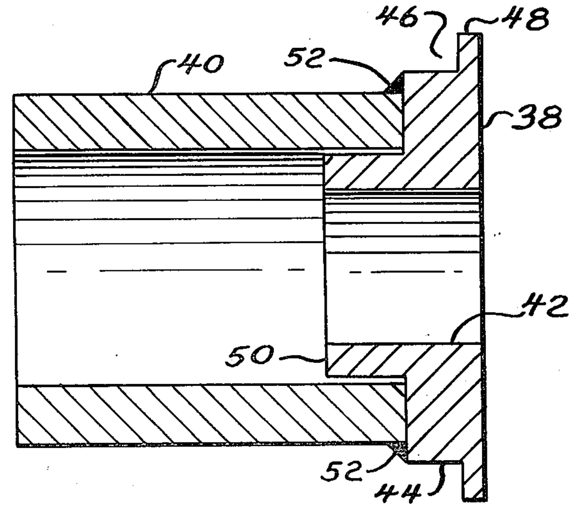
FIG. 2 is a sectional view of a stop tube made according to the invention.

An exemplary embodiment of a stop tube made according to the invention is illustrated within a cylinder, generally designated 10, as seen in FIG. 1. The cylinder 10 includes a cylinder portion 12 having an internal bore 14 which is closed by heads 16 and 18. The head 16 includes an inlet portion 20, while the head 18 includes a central bore 22 through which a piston rod 24 extends. Suitable bushings and bearings 26 impale the rod 24 and are associated with the bore 22 in a conventional fashion.

The end of the rod 24 within the bore 14 mounts a piston 28 flanked in turn by a pair of annular seals 30 which are held in place by seal retainers 32.

A stop tube assembly made according to the invention, generally designated 34, is located within the bore 14 about the rod 24 and interposed between the piston 28 and the head 18 through which the rod 24 extends. Also within the bore 14 is a coil spring 36 located about the rod 24 for biasing the piston 28 to the right as seen in FIG. 1. The spring 36 thus serves as a return spring.

From the foregoing, it will be appreciated that the cylinder 10 is of the single-acting, single-rod end variety. It is, however, to be understood that the stop tube assembly 34 of the invention herein may be advantageously employed in double-acting cylinders and double-rod end cylinders, and no restriction to a particular type of cylinder is intended.

Stop tube assembly 34 consists of two basic components. The first is a base slug 38 while the second is a tube 40. The base slug 38 includes a central bore 42 of slightly greater diameter than the diameter of the rod 24 so as to be freely slidable on the latter. Moreover, the slug 38 is generally cylindrical in shape and includes a first annular boss 44 on one end thereof which in effect defines a recess 46 for receipt of one end of the coil spring 36. Stated another way, the annular boss 44 defines a radially outwardly extending flange 48 against which one end of the spring 36 may abut.

The first annular boss 44 in turn mounts a second annular boss 50. The outer diameter of the annular boss 50 is just slightly less than the internal diameter of the tube 40 which, in turn, is substantially greater than the diameter of the rod 24. Moreover, the outer diameter of the tube 40 is slightly less than the diameter of the first annular boss 44 so as to define a small ledge at the interface of the tube 40 and the base slug 38 by which the two may be secured together by welds 52. In a highly preferred embodiment of the invention, the outer diameter of the second annular boss 50 is chosen to be on the order of 0.007 inches less than the internal diameter of the tube 40 so that the boss 50 serves as a guide for receipt of the tube 40 as well as serving as a pilot for the interconnection so as to maintain acceptable limits of concentricity with respect to the base slug 38 while the welds 52 are being made without the need of jigs.

While the stop tube assembly 34 has been shown herein as having the base slug 38 in abutment with the piston 28, actually, one of the seal retainers 32 associated with the piston 28, it will be appreciated that in some instances, its position can be reversed such that the base slug 38 will be adjacent the head 18.

Figure 3:
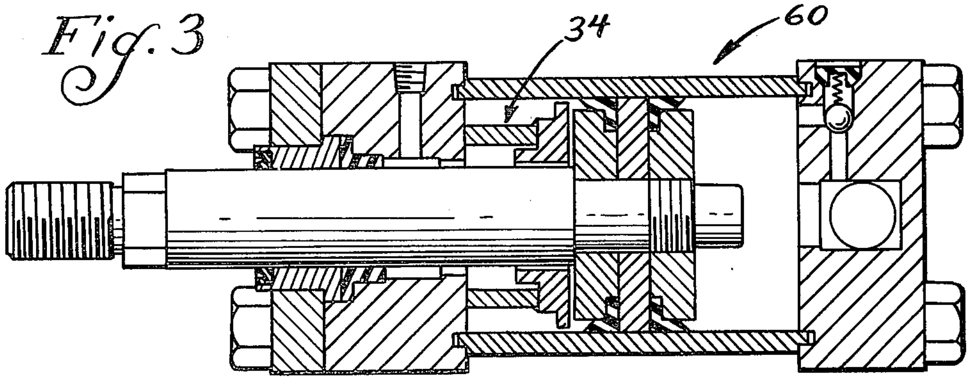
FIG. 3 is a sectional view of a double-acting cylinder employing the stop tube.

FIG. 3 illustrates the employment of a stop tube assembly 34 made according to the invention in a conventional double-acting cylinder generally designated 60. Since the cylinder 60 is conventional in all respects, it will not be described in detail.

From the foregoing, it will be appreciated that a stop tube assembly made according to the invention eliminates the need for the use of special jigs heretofore required in welding a stop tube to a piston or to a head. It also eliminates any need for the consideration of the design of a piston or seal retainer where a spring is to be interposed between the head and the piston by reason of the provision of the flange 48. It will also be recognized that as a wholly removable element of the cylinder, it can be reused in other cylinders and can be stocked in inventories separate from cylinders and readily installed in the event a customer order requires a cylinder having a stop tube. It will also be recognized that the formation of the stepped tube assembly from two component parts minimizes manufacturing operations. For example, for cylinders having a rod of a given size, only one base slug 38 need be designed allowing tubes 40 of varying length to be manufactured to provide a variety of stop tubes for such cylinders. Lastly, stop tube assembly 34 made according to the conventional can be employed with equal facility in single-acting cylinders, double-acting cylinders, double-rodded cylinders, etc.

We claim:

1. In a fluid actuated cylinder, the combination comprising:

a cylinder having an internal bore;

means defining a pair of cylinder heads, each at a respective end of said cylinder and closing the associated end of said bore;

a piston received in said bore for reciprocal movement therein;

a piston rod secured to said piston and having at least one end emerging from said bore through one of said heads;

a stop tube having an interior slightly larger than said rod and freely slidably received on said rod and interposed between said piston and the head through which said rod emerges from said bore for engaging said head and said piston to limit movement of said piston toward the head through which said rod emerges from said bore;

a coil spring about said rod within said bore, said stop tube including a radially outwardly extending flange in nonsealing relation to said internal bore, said spring having one end abutting said flange, an intermediate portion surrounding said stop tube and its other end abutting one of said heads and said piston.

2. The fluid-actuated cylinder of claim 2 wherein said flange is on an end of said stop tube adjacent said piston and said spring other end abuts the head through which said rod emerges from said bore.

3. In a fluid-actuated cylinder, the combination comprising:

a cylinder having an internal bore;

means defining a pair of cylinder heads, each at a respective end of said cylinder and closing the associated end of said bore;

a piston received in said bore for reciprocal movement therein;

a piston rod secured to said piston and having at least one end emerging from said bore through one of said heads;

a stop tube freely slidably received on said rod and interposed between said piston and the head through which said rod emerges from said bore for engaging said head and said piston to limit movement of said piston toward the head through which said rod emerges from said bore;

said stop tube including a generally cylindrical base having a bore receiving said rod and of slightly greater diameter than said rod, said base further including an annular recess in the side thereof, said recess further opening to one end of said base to define a stepped configuration, and an elongated tube having an internal diameter substantially greater than the diameter of said rod, said tube being secured at one end to said base in said recess.

4. A fluid-actuated cylinder according to claim 3 wherein the outer diameter of said tube is less than the maximum outer diameter of said base to thereby define an annular, radially outwardly extending flange on said base; said fluid-actuated cylinder further including a coil spring within said bore and about said rod and said tube, one end of said coil spring being in abutment with said flange.

5. A fluid-actuated cylinder including a stop tube, comprising:

a cylinder having an internal bore;

a piston within said bore;

a piston rod secured to said piston and having an end emerging from said bore; and a stop tube assembly freely slidable on said piston rod within said bore, said stop tube assembly including a generally cylindrical base having a central bore of slightly greater diameter than the diameter of said piston rod, said rod extending through said central bore, a first cylindrical boss extending from one side of said base, a second cylindrical boss of lesser diameter than said first cylindrical boss extending from said first cylindrical boss, and an elongated tube secured to said base and disposed substantially concentrically about said second cylindrical boss.

6. The fluid-actuated cylinder and stop tube of claim 5 further including a coil spring disposed about said piston rod and having one end disposed about said tube and said first cylindrical boss.

* * * * *